United States Patent
Dreps et al.

(10) Patent No.: US 6,930,507 B2
(45) Date of Patent: Aug. 16, 2005

(54) THEVENINS RECEIVER

(75) Inventors: Daniel M. Dreps, Georgetown, TX (US); Frank D. Ferraiolo, New Windsor, NY (US); Anand Haridass, Austin, TX (US); Bao Gia-Harvey Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 10/616,845

(22) Filed: Jul. 10, 2003

(65) Prior Publication Data

US 2005/0007145 A1 Jan. 13, 2005

(51) Int. Cl.[7] .......................................... H03K 19/003
(52) U.S. Cl. ........................ 326/30; 326/21; 326/86; 326/83; 327/108; 710/100
(58) Field of Search ................... 326/30, 21, 83, 326/86, 90, 87, 35, 36; 327/108; 710/100, 126

(56) References Cited

U.S. PATENT DOCUMENTS

| | | | | |
|---|---|---|---|---|
| 5,739,707 A | * | 4/1998 | Barraclough | 327/112 |
| 6,288,564 B1 | * | 9/2001 | Hedberg | 326/30 |
| 6,347,350 B1 | * | 2/2002 | Muljono | 710/100 |
| 6,429,678 B1 | * | 8/2002 | Wong et al. | 326/30 |
| 6,515,502 B1 | * | 2/2003 | Hsiao et al. | 326/30 |
| 6,556,038 B2 | * | 4/2003 | Kim et al. | 326/30 |
| 6,747,475 B2 | * | 6/2004 | Yuffe et al. | 326/30 |

* cited by examiner

*Primary Examiner*—Vibol Tan
(74) *Attorney, Agent, or Firm*—Richard F. Frankeny; Winstead Sechrest & Minick P.C.; Casimer K. Salys

(57) ABSTRACT

A termination network has multiple resistors forming multiple voltage dividers with a common node. Half of the resistors are coupled to the positive power supply voltage with P channel field effect transistors (PFETs) and the other half are coupled to the negative or ground power supply voltage with N channel FETs (NFETs). Logic signals are used to control the gates of the FETs. By modifying which FETs are ON, the termination network can be selectively controlled to produce various offset levels with the same impedance level. The impedance levels may also be modified while maintaining the same offset level. A delay circuit may be selectively employed to feedback control signals after a selected delay time to adjust the threshold level to dynamically or statically optimize signal reception.

42 Claims, 4 Drawing Sheets

THEVENINS RECEIVER

TECHNICAL FIELD

The present invention relates in general to transmission line (TL) receivers and in particular to receivers with controllable termination impedance and offset voltages.

BACKGROUND INFORMATION

The speed of communication between integrated circuits and subsystems has been increasing. It is often desirable to communicate at frequencies above a gigahertz (GHz). At these frequencies, the circuit lines must be treated as transmission lines (TLs) if good signal integrity and reliable transmission is required. Theoretically, it is ideal to terminate a TL in an impedance equal to its characteristic impedance ($Z_0$). $Z_0$ is normally expressed as the square root of the ratio of capacitance per unit length to inductance per unit length for a lossless TL.

Practical TLs are lossy, therefore, it is sometimes desirable to have the termination impedance higher than the characteristic impedance to cause a small reflection which adds to the transmitted signal in such a way to make the overall signal swing larger. The signals transmitted on TLs may lose their pure binary values and become analog. Receivers "detect" these analog signals and convert them back to binary signals with controlled logic one and zero levels. Receivers have threshold levels and a received signal that swings above the threshold level will cause the receiver output to be switched to a logic one and a signal that swings below the threshold will cause the receiver output to be switched to a logic zero. In practical circuits, receivers may not have threshold levels that are at the mid-point of the power supply. In these cases, it may be desirable to vary or change the offset of a received signal without changing the receiver termination impedance. Dynamically adjusting termination impedance and offset voltage would enable signal integrity and margins to be optimized.

There is, therefore, a need for a method and circuitry to allow the termination impedance and offset voltage to be varied independently to optimize signal transmission and reception.

SUMMARY OF THE INVENTION

An active termination network comprises multiple resistor divider circuits. Each resistor divider has three terminals, a positive power terminal coupled to one terminal of a "high side" resistor, a negative power terminal coupled to one terminal of a "low side" resistor, and a common terminal coupled to the second common terminal of both the high and low side resistors. The positive power terminal of each resistor divider is coupled to the positive power supply voltage potential with a P channel field effect transistor (PFET) and each negative power terminal is coupled to the negative power supply voltage potential with an N channel field effect transistor (NFET). The gates of the PFETs and NFETs are coupled to control signals that allow combinations of resistors to be selectively connected and disconnected from their corresponding negative and positive power supply voltages and therefore the common terminal. The common terminal has an equivalent Thevenins resistance (TER) and Thevenins voltage (TEV) depending on which resistors are selected at any one time. When the common terminal is coupled to the receiving end of a TL, the termination impedance and the offset voltage seen by a receiver may be adjusted with the control signals. The plurality of high and low side resistors are chosen such that the same TER may be realized with different TEVs allowing the termination impedance to be held constant while varying the offset. Likewise, the resistors are such that the same offset (TEV) may be realized while varying the TER. An adaptive delay network is provided so that the selections of resistors in the programmable termination networks may be modified after a delay time in response to the control signals to allow the network to be continuously modified to compensate for changing signal transmission conditions and changing bit times. Embodiments of the present invention allow the termination network to be converted into a driver for testing purposes by selecting all the higher side resistors when a logic one is to be transmitted and all of the low side resistors when a logic zero is to be transmitted.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
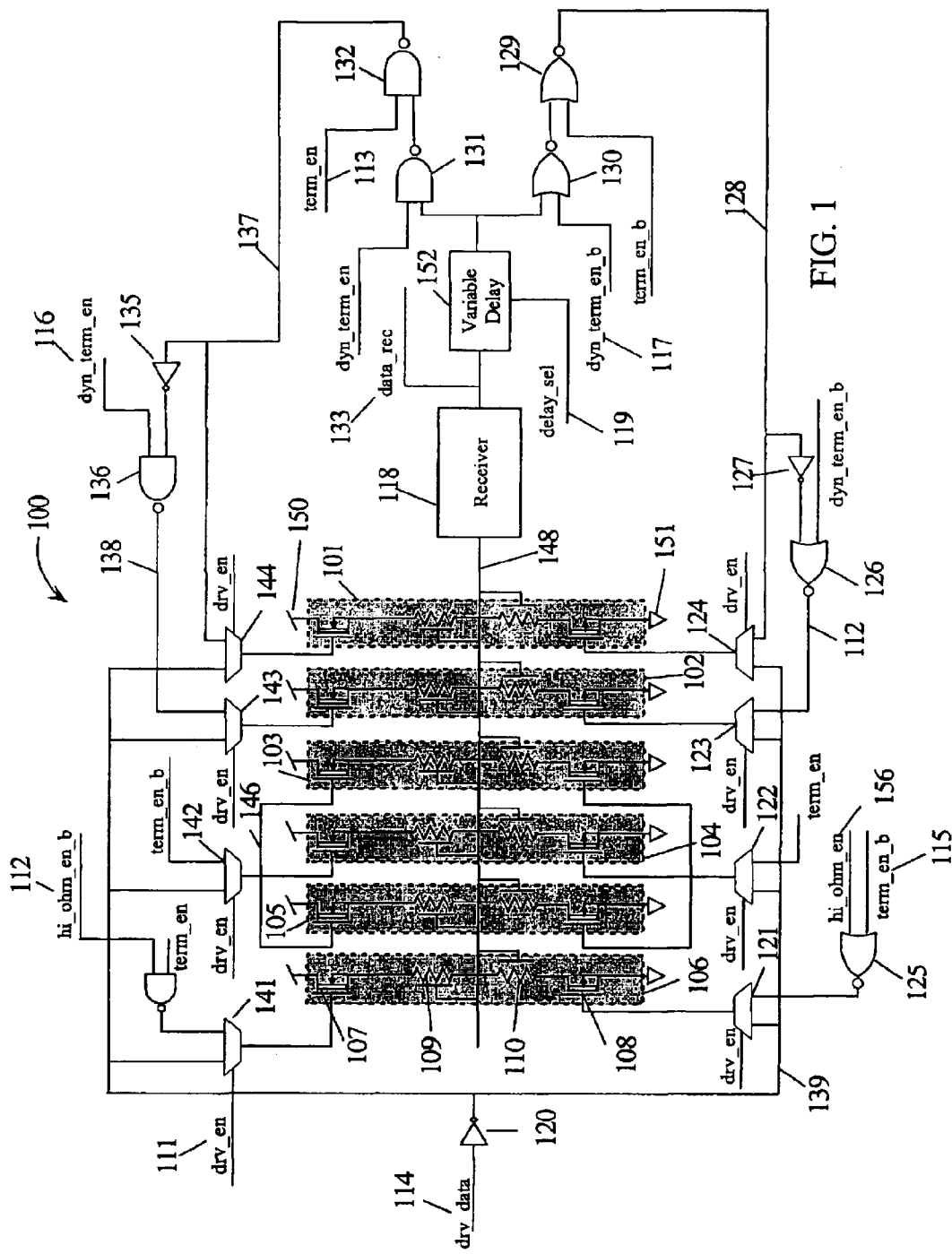
FIG. 1 is a circuit diagram of the termination network and control logic according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
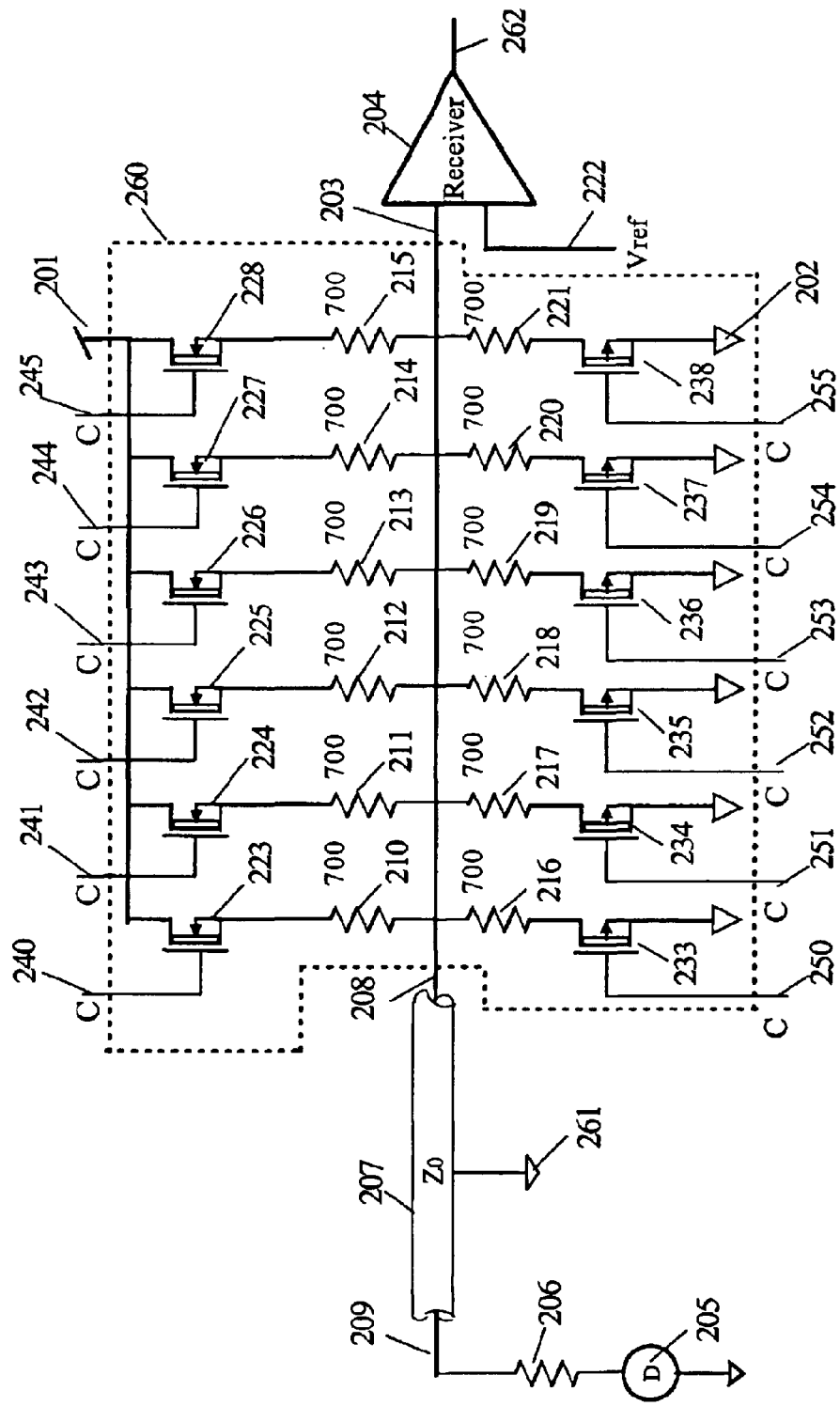
FIG. 2 is a circuit diagram of the termination network according to embodiments of the present invention coupled to a TL, a driver, and a receiver.

FIG. 2 is a detailed circuit diagram of an active termination network 260 for a TL according to embodiments of the present invention. A driver 205 has a source impedance 206 and is coupled to TL 207 having an input 209 and an output 208. Output 208 is coupled to the common terminal 203 of the active termination network 260. A receiver 204 is also coupled to common terminal 203 and detects signals on common terminal 203 by comparing the signals relative to threshold voltage Vref 222 generating a detected signal at output 262. Active termination network 260 is shown with six selectable resistive voltage divider networks. A different number of resistive dividers with different values of resistors may be used and still remain within the scope of the present invention. The resistors 210–215 coupled to PFETs 223–228 are termed high side resistors as they connect to the positive terminal 201 of a power supply. Likewise, resistors 216–221 coupled to NFETs 233–228 are termed low side resistors as they connect to the negative terminal 202 of the power supply. It should be noted that resistors 210–215 and 216–221, while shown in FIG. 2 as lumped values, are in actuality made up of a discrete resistor and the ON resistance of the corresponding FETs that selects the resistors. However, in FIG. 2 an in other figures the resistors are shown as discrete components for simplicity. The gates of PFETs 223–228 are controlled by control signals C 240–C 245 respectively and the gates of NFETs 233–238 are controlled by control signals C 250–C 255 respectively. When one or more of the PFETs or NFETs are gated ON, the alternating current (AC) impedance (all voltage sources are considered to have zero AC impedance) from the common terminal (node) 203 to the positive terminal (node) 201 substantially equals the parallel combination of the selected resistors. This is called in the art the "Thevenins" equivalent resistance (TER) after the discoverer of this equivalence. For example, if two PFETs are gated ON, the TER from node 203 to node 201 is 700/2 or 350 ohms. Therefore the lowest high side TER of 116.66 ohms results when all six resistors are selected. When combinations of resistors are selected by gating the PFETs and NFETs ON, an equivalent network looking into the node 203 results which is called the Thevenins equivalent network. This Thevenins equivalent network comprises a TER coupled to node 203 and a corresponding open circuit Thevenins equivalent voltage (TEV). By selecting different combinations of high and low side resistors, the TER of node 203 may be held constant while varying the TEV and the TEV may be held constant while varying the TER. A signal arriving at output 208 will transition around the TEV and the amplitude of the signal will vary depending on the value of the TER.

If TL 207 was lossless, then its ideal termination condition would be for the TER to match its characteristic impedance ($Z_0$). A variety of conditions (from series resistance, eddy current losses, noise coupling, etc.) may cause TL 207 to be less than ideal (lossy). By incorporating an active termination network 260, distortions in a received signal may be compensated by selectively coupling the high and low side resistors.

FIG. 1 is a circuit diagram of a receiver system 100 according to embodiments of the present invention. Common input node 148 is coupled to receiver 118 which converts a received signal (not shown) on node 148 into received digital data (Data_Rec 133). Node 148 is coupled to a termination network comprising six selectable resistor dividers sections (RDS) 101–106. The detailed operation of an RDS was explained in detail relative to FIG. 2. It should be noted that while all the resistors, PFETs, and NFETs are considered part of an RDS, both resistors in an RDS do not have to be connected or disconnected at any one time.

Exemplary RDS 106 has a high side resistor 109 that is coupled to the positive power supply potential 150 by PFET 107 and a low side resistor 110 that is coupled to the negative power supply potential (ground) 151 by NFET 108. The high side PFETs of RDS 101–106 are controlled by the outputs (control signals) of two way multiplexers (MUXs) 141–144. Each MUX 141–144 has two inputs which are directed to their corresponding outputs in response to logic states of the driver enable signal (drv_en) 111. When drv_en 111 is a logic one, then driver data (drv data) 114 is coupled via the output of logic inverter 120 to the gates of all the FETs, PFETs and NFETs in RDS 101–106. In this manner, either all the high side PFETs or all the low side NFETs may be gated ON at one time if the "driver" mode (drv_en 111 is a logic one) is selected for receiver system 100. The driver mode is usually selected during a "wrap around" condition when testing a communication link. Alternatively, when drv_en 111 is a logic zero, the various control inputs to MUXs 141–144 and MUXs 121–124 are used to direct control signals to the gates of the FETs in RDS 101–106.

The logic circuitry of receiver system 100 couples multiple control signals to the gates of the FETs in RDS 101–106 in response to mode signals and allows the following modes of operation for the receiver system 100:

Disabled Mode

When logic control signals drv_en 111, terminator enable (term_en) 113, and dynamic terminator enable (dyn_term_en) 116 are all a logic zero, then none of the FETs in RDS 101–106 may be turned ON and thus there is no termination on node 148. It should be noted that control signals term_en_b 115 and dyn_term_en_b 117 are the logic inversion of term_en 113 and dyn_term_en 116 since the PFETs and NFETs are gated ON and OFF with opposite polarity signals.

Wrap Drive Mode

For level sensitive scan design (LSSD) testing, it may be necessary to have a "wrap driver" that can drive the input/output (I/O) pad to a specified voltage level. In embodiments of the present invention, the I/O pad (node 148) may be driven to a value determined by the signal drv_data 114 when drv_en 111 is a logic one selecting the driver mode. All the MUXs 141–144 and 121–124 select the output of inverter 120 to drive the gates of the respective FETs they control in this mode.

Split Terminator Mode

Embodiments of the present invention set the receiver system 100 to have "standard" or nominal terminator values for TEV and TER wherein the TER is matched to the $Z_0$ of a TL (not shown) coupled to node 148 and the TEV is set to one half of the power supply voltage 150. In this mode, term_en 113 is set to a logic one, dyn_term en 116 is set to a logic zero and hi_ohm_en is set to a logic zero. In this configuration, the FETs in RDS 101 and 103–106 are gated ON by their respective control signals. If the high and low side resistors (e.g., 109 and 110 respectively) are selected to be 700 ohms, then the equivalent high side resistance is 140 ohms and the equivalent low side resistance is 140 ohms. This results in a TER of 70 ohms and a TEV of one half the power supply voltage. Transmission lines used with complementary metal oxide silicon (CMOS) drivers typically have a characteristic impedance of 70 ohms, hence this is termed a "standard terminator." Since the TEV is determined by a voltage divider, this type of termination is called a "split terminator."

High Ohm Split Terminator

In some network circuit topologies, there may be a need to terminate a TL in an impedance higher than its $Z_0$. Ideally, the equivalent termination impedance should be equal to $Z_0$. However, in the case where the TL is lossy (most practical networks), terminating at $Z_0$ may result in a loss of signal amplitude (signal swing). It has been determined that increasing the termination resistance to a value larger than a TL's $Z_0$ increases the received signal swing; however, it may also increase the variation in the detected signal transition timing (called jitter) over that of "standard" $Z_0$ termination.

Figure 4:
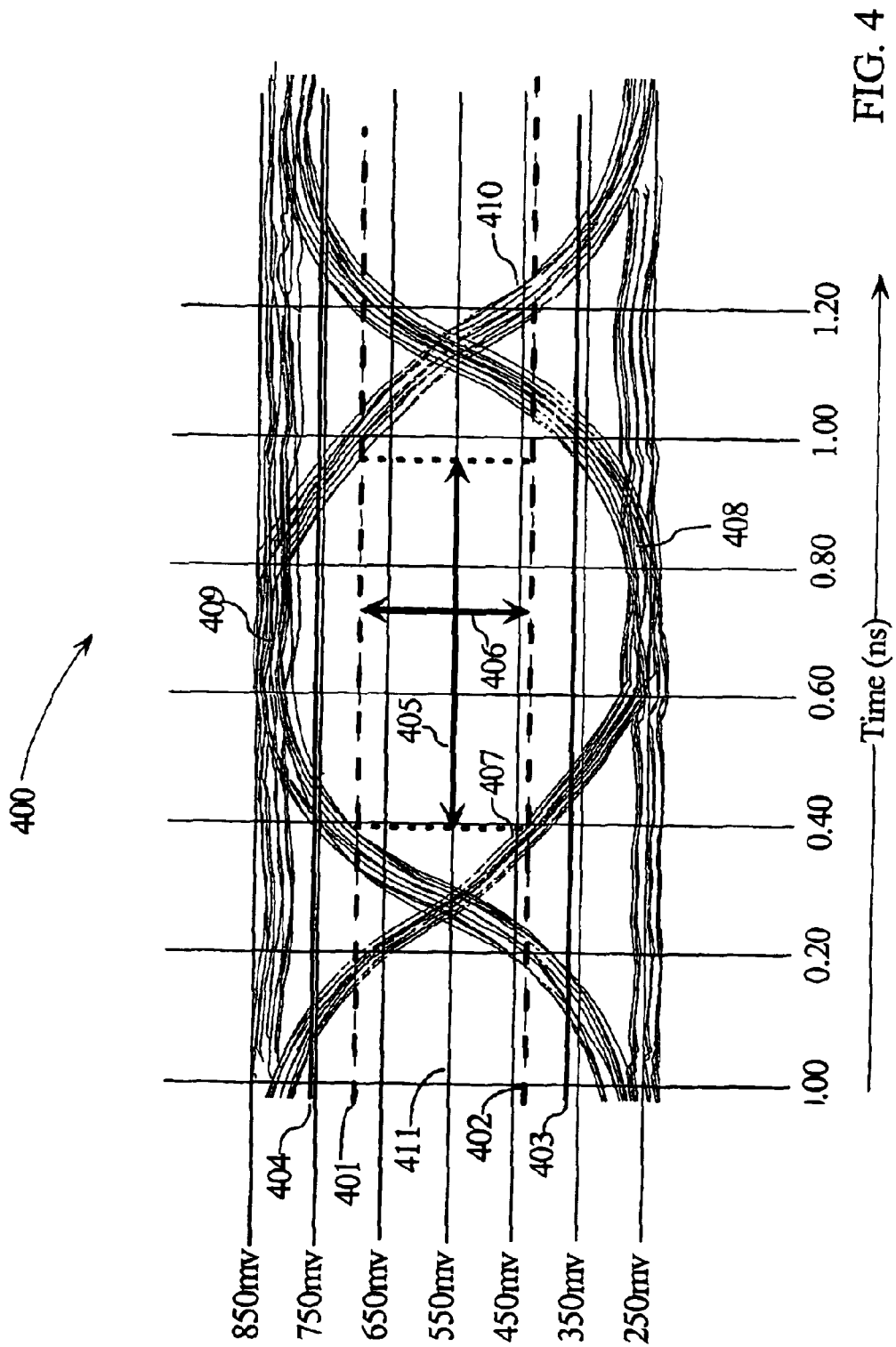
FIG. 4 is an illustration of waveforms of repetitive signals received at the far end of a TL forming an "eye" pattern of signal distributions.

Jitter occurs because the increased signal swing is due to reflections at the receiver end which may ultimately bounce between the near and far end of the TL and may not always be synchronous with the transition timing of the received signal thus causing switching in the receiver (e.g., receiver 118) to vary. When the TER is increased, the far end (e.g., node 148) will begin to increasingly perform like a non-terminated TL. This is essentially the point where the increased signal swing is negated by the increase in jitter. In a circuit network where the signal to noise ratio is low, increasing the signal swing may have a positive effect. If a determination is made that the resulting jitter is tolerable, then the high ohm split termination mode may be used effectively. If multiple traces (oscilloscope traces) are taken with a repetitive signal, the signal transitions will appear as bands indicating the different paths the signal takes as it transitions between logic one and logic zero (FIG. 4). If signal swings were perfect (transition times much smaller that the signal period) and there was no jitter, then the traces on the oscilloscope would appear as a single horizontal line representing the logic one state, a single horizontal line representing the logic zero state and two vertical lines, one representing a transition from a logic one to a logic zero and the other representing a transition from a logic zero to a logic one. The open space between these lines is referred to as the "eye" of the repetitive waveform which has a voltage value and a time interval value. As jitter increases and as signal swings become smaller or more variable, the "eye" closes down indicating that the margin between a detected logic one and detected logic zero will become smaller and the timing symmetry is reduced. Widening the "eye" thus is considered to improve received signals and makes for better signal detection by a receiver.

To enable the high ohm split termination mode, the high ohm enable signal (hi_ohm_en) 156 is set to a logic one which turns OFF the PFETs and NFETs in RDS 106 and 104. In this case, the high and low side resistances result from the parallel combination of four 700 ohm resistors which has an equivalent TER of 87.5 ohms. This value is greater than the "ideal" 70 ohms that was stated to be standard. Other values of high ohm split termination are possible and are within the scope of the present invention.

Dynamic Terminator Mode

To improve the "eye" of a received signal, embodiments of the present invention may use the dynamic terminator mode. The "eye" opening and the magnitude of the received signal swing of a TL, terminated according to embodiments of the present invention, are directly related to the Thevenins equivalence values of the split terminator. To assert the dynamic terminator mode, the signal, dynamic terminator enable (dyn_term_en) 116, is set to a logic one, term_en 113 is set to a logic one, and hi_ohm_en 156 is set to logic zero. To see how this mode operates, again assume that the high and low side resistors in RDS 101–106 are 700 ohms. A constant TER of 70 ohms may be realized by turning ON all PFETs and NFETs in RDS 102–106. However, the same TER value may be obtained by turning ON all PFETs in RDS 101–106 and all NFETs in RDS 103–106. The NFETs in RDS 101 and RDS 102 are likewise turned OFF. The termination network that results is 116.7 ohms coupled to the positive power supply potential and 175 ohms to ground resulting in a TER of 70 ohms. Since the high side resistance is smaller than the low side resistance, the resulting TEV is higher than one half of the power supply voltage 150.

Another way to achieve a TER of 70 ohms is by turning ON all of the NFETs in RDS 101–106 and all of the PFETs in RDS 101–104 and turning OFF the PFETs in RDS 105 and RDS 106. In this case, the TEV is lower than one half the power supply voltage 150 (Vdd/2). In both these cases, the TER does not change but the TEV does change.

In a far end (end of TL opposite the driver, e.g., node 148) split termination, the received signal will swing about the direct current (DC) offset (the TEV) of the termination network. If this offset is higher than Vdd/2, the received signal at node 148 will swing around this higher voltage and vice versa. In the dynamic termination mode, it is possible to "dynamically" adjust the DC offset based on the logic states of the incoming received data (Data_rec) 133 while maintaining a constant TER value. When Data_rec 133 is a logic zero, a "state A" is termed to exist. When Data_rec 133 is a logic one, a "state B" is termed to exist. Embodiments of the present invention switch dynamically and change the terminator condition in a sub-cycle fashion based on the existence of state A or state B to improve the "eye" opening of received signals. When Data_rec 133 has transitioned to a logic one, the termination network is switched so that the TEV moves down (below the threshold voltage (VT) of the receiver) so that the subsequent transition from a logic one to a logic zero has less of a transition to make to pass the through the VT (e.g., VT 222 in FIG. 2). Likewise when the detected signal is at a logic zero, the termination network is switched so that the TEV moves up (again above VT) so that the transition from a logic zero to a logic one has less of a transition to make to pass through VT. This improves the "eye" opening.

Logic circuitry comprising programmable variable delay 152, and logic gates 129–132 generated feedback signals 128 and 137. The feedback signals are complementary as they are used as control signals to NFETs and PFETs respectively in RDS 101. The NFETs turn ON with a logic one voltage level and the PFETs turn ON with a logic zero voltage level. Logic gates 135 and 136 generate feedback signal 138 for the PFET in RDS 102 logic gates 126 and 127 generate feedback signal 112 for the NFET in RDS 102. If dyn_term_en 116 is a logic zero, then RDS 102 is gated OFF and RDS 101 is gated ON. In the dynamic mode, RDS 101 and 102 turn ON and OFF in response to their feedback signals 137 and 128, when the dynamic mode is OFF, RDS 101 is turned ON and RDS 102 is turned OFF.

Variable delay 152 is set by delay select signal del_sel 119. Data_rec 133 is delayed to adjust where in the sub-cycle of the data frequency the feedback signals 128 and 137 switch the termination network. Variable delay 152 may be set depending on the length of a transmission line coupled to node 148 and the time period of transmitted bits. Other types of signal quality parameters (e.g., signal to noise ration, signal skew) may be used in determining variable delay 152 for a particular transmission line or for a group of transmission lines use for a number of like signals. Variable delay 152 may be statically set for groups of transmission lines on a system power up or it may be changed under a diagnostic routine that monitors errors that occur in signal transmission in particular networks.

High Ohm Dynamic Termination Mode

In the discussion relative to the High Ohm Split Terminator Mode, it was noted that increasing the TER of the termination relative to the characteristic impedance of the TL being terminated results in a higher signal because of reflections. This same effect may be used in the dynamic termination mode. In the normal Dynamic Termination Mode, PFET 107 and NFET 108 are gated ON. By turning PFET 107 and NFET 108 OFF, the TER will increase and thus increase the signal swing of a received at node 148. The increased signal swing may be used with dynamically changing the TEV to compensate received signals.

Figure 3:
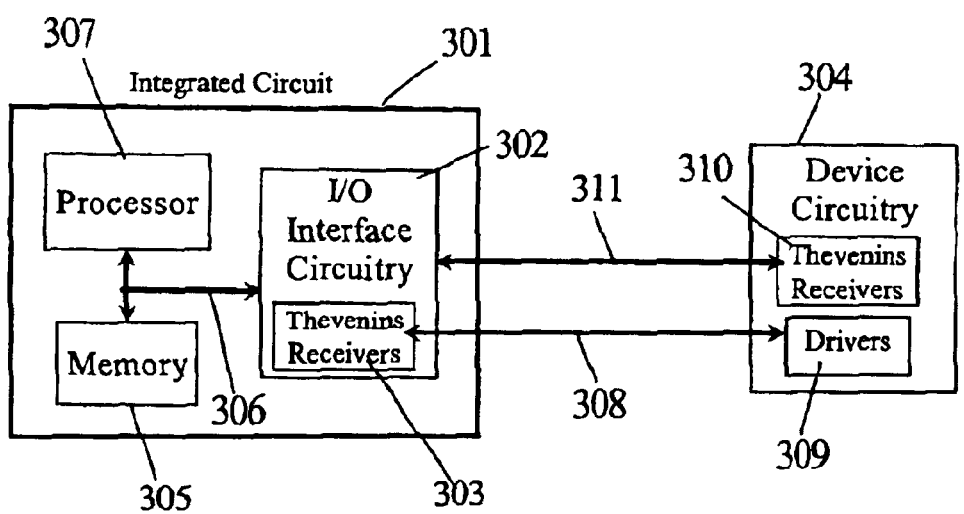
FIG. 3 is a block diagram of an integrated circuit (IC)

FIG. 3 is a block diagram of an integrated circuit (IC) 301 according to embodiments of the present invention. IC 301 comprises a processor 307, memory 305, I/O interface circuitry 302 and a bus 306 enabling communication between these functions. I/O interface circuitry 302 further comprises Thevenins receivers 303 communicating with "off chip" device circuitry 304 with one or more TLs 308. Thevenins receivers 303 are designed according to embodiments of the present invention and may further be programmed with mode control signals and programmed delay signals from processor 307 to operate in various termination modes as discussed relative to FIG. 1. Device circuitry 304 also has drivers 309 corresponding to the one or more TLs 308. To provide complete communication between IC 301 and device circuitry 304, IC 301 may have TL drivers (not shown) and device circuitry 304 may have Thevenins receivers 310 coupled to TLs 311 according to embodiments of the present invention. The transmission lines 308 and 311 are shown with bidirectional arrows because of the described "wrap" mode where the Thevenins network may operate in a driver mode for testing.

FIG. 4 illustrates a superposition of many received signals (e.g., at node 148) from a TL (not shown). FIG. 4 defines what is meant by the "eye" of the waveforms as discussed in embodiments of the present invention. If one alternates between sending a repetitive signal and its complement, then a time lapse oscillograph of received waveforms would show that the waveform transitions between a logic one and a logic zero actually vary (e.g., positive transitions 407 and negative transitions 410). The actual voltage levels corresponding to a logic one (409) and a logic zero (408) also show dynamic variances. The voltage value of the "eye" is illustrated by arrow 406 between voltage levels 401 and 402 and the time value is illustrated by arrow 405 between the transitions at voltage levels 401 and 402. Voltage level 401 illustrates the voltage above where a received signal is defined as a logic one and level 402 illustrates the voltage below where a received signal is defined as a logic zero. The crossover point 411 (voltage 550 mv) is an ideal threshold voltage for a receiver detecting waveforms 400. The voltage between 401 and 411 may be called the positive signal to noise margin and the voltage between 411 and 402 may be called the negative signal to noise margin.

Although the present invention and its advantages have been described in detail, it should be understood that various changes, substitutions and alterations can be made herein without departing from the spirit and scope of the invention as defined by the appended claims.

What is claimed is:

1. A receiver circuit for terminating a transmission line comprising:
   a receiver having an input coupled to a transmission line output of said transmission line forming a common node, an output generating a digital signal in response to a signal at said transmission line output and a threshold voltage;
   a termination network coupled to said common node for setting a plurality of Thevenins voltages and Thevenins impedances in response to a plurality of control signals; and
   logic circuitry for generating said plurality of control signals in response to a plurality of mode setting inputs.

2. A receiver circuit for terminating a transmission line comprising:
   a receiver having an input coupled to a transmission line output of said transmission line forming a common node, an output generating a digital signal in response to a signal at said transmission line output and a threshold voltage;
   a termination network coupled to said common node for setting a plurality of Thevenins voltages and Thevenins impedances in response to a plurality of control signals; and
   logic circuitry for generating said plurality of control signals in response to a plurality of mode setting inputs, wherein said termination network comprises a first termination network coupled to said common node and setting a Thevenins impedance and a Thevenins voltage at said common node and a second termination network coupled to said common node and modifying said Thevenins impedance an said Thevenins voltage in response to first and second control signals.

3. The circuit of claim 2 further comprising a third termination network coupled to said common node and modifying said Thevenins impedance and said Thevenins voltage in response to third and fourth control signals generated by said logic circuitiy.

4. The circuit of claim 2, wherein said first termination network is coupled to said common node in response to fifth and sixth control signals generated by said logic circuitry.

5. The circuit of claim 4, wherein said second terminaton network comprises:
   a first resistor having a first terminal coupled to a first power supply voltage with a first electronic switch in response to a first logic state of said first control signal and a second terminal;
   a second resistor having a first terminal coupled to said second terminal of said first resistor and said common node and a second terminal coupled to a second power supply voltage with a second electronic switch in response to a first logic state of said second control signal.

6. The circuit of claim 3, wherein said third termination network comprises:
   a first resistor having a first terminal coupled to said first power supply voltage with a first electronic switch in response to a first logic state of said third control signal and a second terminal;
   a second resistor having a first terminal coupled to said second terminal of said first resistor and said common node and a second terminal coupled to a second power supply voltage with a second electronic switch in response to a first logic state of said fourth control signal.

7. The circuit of claim 4, wherein said first termination network comprises:
   a first resistor having a first terminal coupled to said first power supply voltage with a first electronic switch in response to a first logic state of said fifth control signal and a second terminal;
   a second resistor having a first terminal coupled to said second terminal of said first resistor and said common node and a second terminal coupled to said second power supply voltage with a second electronic switch in response to a first logic state of said sixth control signal.

8. The circuit of claim 2, wherein said receiver circuit is a logic gate having a first logic input coupled to said receiver input, a second logic input coupled to a voltage corresponding to a first logic state, wherein said threshold voltage is a switching voltage of said logic gate and is generated internal to said logic gate.

9. The circuit of claim 2, wherein said receiver circuit is a comparator having a positive input coupled to said input of said receiver, a negative input coupled to said threshold voltage and a comparator output coupled to said receiver output.

10. The circuit of claim 4, wherein said receiver circuit is a comparator having a positive input coupled to said input of said receiver, a negative input coupled to said threshold voltage and a comparator output coupled to said receiver output.

11. The circuit of claim 7, wherein said threshold voltage is equal to one half the difference between said first and second power supply voltages.

12. The circuit of claim 4, wherein said mode inputs comprise a first mode input for setting said Thevenins impedance to substantially match a characteristic impedance of said transmission line (TL) and said Thevenins voltage to substantially match said threshold voltage, wherein said first, second, fifth and sixth electronic switches are gated ON by said first, second, fifth and sixth control signals.

13. The circuit of claim 12, wherein said mode inputs comprise a second mode for setting said Thevenins impedance to substantially match a characteristic impedance of said TL and said Thevenins voltage to greater than said threshold voltage, wherein said first, second, third and fifth electronic switches are gated ON by said first, second, third and fifth control signals.

14. The circuit of claim 13, wherein said mode inputs comprise a third mode for setting said Thevenins impedance to substantially match a characteristic impedance of said TL and said Thevenins voltage to less than said threshold voltage, wherein said first, second fourth and sixth electronic switches are gated ON by said first, second fourth and sixth control signals.

15. The circuit of claim 14, wherein said mode inputs comprise a fourth mode for setting said Thevenins impedance to greater than a characteristic impedance of said TL and said Thevenins voltage to substantially equal said threshold voltage, wherein said first and second electronic switches are gated on by said first and second control signals.

16. The circuit of claim 15, wherein said mode inputs comprise a fifth mode for setting said Thevenins impedance to less than a characteristic impedance of said TL and said Thevenins voltage to substantially equal said threshold voltage, wherein said first, second, third, fourth, fifth, and sixth electronic switches are gated ON by said first, second, third, fourth, fifth, and sixth control signals.

17. The circuit of claim 16, wherein said mode inputs comprise a driver mode wherein said first, second, and third termination networks operate as a driver circuit for impressing a drive signal on said common node in response to logic states of a driver signal controlling said first, second, third, fourth, fifth and sixth control signals, wherein said second, fourth and sixth electronic switches are gated ON by a first logic state of said driver signal and said first, third, and fifth electronic switches are gated ON by a second logic state of said driver signal.

18. The circuit of claim 15, wherein said logic circuitry comprises:
circuitry for alternating between selected of said first, second, third, fourth, and fifth modes in response to a first logic state of a dynamic enable signal and logic states of a modified receiver output signal;
a state circuit for generating said modified receiver signal in response to said receiver output signal and a selected delay time.

19. The circuit of claim 18, wherein said modified receiver transitions to a first logic state said delay time after said receiver output signal transitions to said first logic state and to a second logic state said selected delay time after said receiver signal transitions to said second logic state, wherein said selected delay time is set by delay control signal.

20. The circuit of claim 19, wherein said circuitry switches to said fourth mode when said modified receiver signal has a first logic state and switches to said fifth mode when said modified receiver signal has a second logic state.

21. The circuit of claim 18, wherein said first logic state of said dynamic mode signal is set in response to a selected signal quality parameter of said receiver output signal.

22. An integrated circuit (IC) comprising:
a digital processor;
memory for storing instructions and data for said processor;
input/output (I/O) interface circuitry for communicating to device circuitry external to said IC;
a receiver circuit in said interface circuitry for terminating a transmission line coupling said receiver circuit to said device circuitry, said receiver circuit further comprising;
a receiver having an input coupled to a transmission line output of said transmission line forming a common node, an output generating a digital signal in response to a signal at said transmission line output and a threshold voltage;
a termination network coupled to said common node for setting a plurality of Thevenins voltages and Thevenins impedances in response to a plurality of control signals; and
logic circuitry for generating said plurality of control signals in response to a plurality of mode setting inputs.

23. An integrated circuit (IC) comprising:
a digital processor;
memory for storing instructions and data for said processor;
input/output (I/O) interface circuitry for communicating to device circuitiy external to said IC;
a receiver circuit in said interface circuitry for terminating a transmission line coupling said receiver circuit to said device circuitry, said receiver circuit further comprising;
a receiver having an input coupled to a transmission line output of said transmission line forming a common node, an output generating a digital signal in response to a signal at said transmission line output and a threshold voltage;
a termination network coupled to said common node for setting a plurality of Thevenins voltages and Thevenins impedances in response to a plurality of control signals; and
logic circuitry for generating said plurality of control signals in response to a plurality of mode setting inputs, wherein said termination network comprises a first termination network coupled to said common node for setting a Thevenins impedance and a Thevenins voltage at said common node and a second termination network coupled to said common node for modifying said Thevenins impedance and said Thevenins voltage in response to first and second control signals.

24. The IC of claim 23 further comprising a third termination network coupled to said common node and modifying said Thevenins impedance and said Thevenins voltage in response to third and fourth control signals generated by said logic circuitry.

25. The IC of claim 23, wherein said first termination network is coupled to said common node in response to fifth and sixth control signals generated by said logic circuitry.

26. The IC of claim 25, wherein said second termination network comprises:
- a first resistor having a first terminal coupled to a first power supply voltage with a first electronic switch in response to a first logic state of said first control signal and a second terminal;
- a second resistor having a first terminal coupled to said second terminal of said first resistor and said common node and a second terminal coupled to a second power supply voltage with a second electronic switch in response to a first logic state of said second control signal.

27. The IC of claim 24, wherein said third termination network comprises:
- a first resistor having a first terminal coupled to said first power supply voltage with a first electronic switch in response to a first logic state of said third control signal and a second terminal;
- a second resistor having a first terminal coupled to said second terminal of said first resistor and said common node and a second terminal coupled to a second power supply voltage with a second electronic switch in response to a first logic state of said fourth control signal.

28. The IC of claim 25, wherein said first termination network comprises:
- a first resistor having a first terminal coupled to said first power supply voltage with a first electronic switch in response to a first logic state of said fifth control signal and a second terminal;
- a second resistor having a first terminal coupled to said second terminal of said first resistor and said common node and a second terminal coupled to said second power supply voltage with a second electronic switch in response to a first logic state of said sixth control signal.

29. The IC of claim 23, wherein said receiver circuit is a logic gate having a first logic input coupled to said receiver input, a second logic input coupled to a voltage corresponding to a first logic state, wherein said threshold voltage is a switching voltage of said logic gate and is generated internal to said logic gate.

30. The IC of claim 23, wherein said receiver circuit is a comparator having a positive input coupled to said input of said receiver, a negative input coupled to said threshold voltage and a comparator output coupled to said receiver output.

31. The IC of claim 25, wherein said receiver circuit is a comparator having a positive input coupled to said input of said receiver, a negative input coupled to said threshold voltage and a comparator output coupled to said receiver output.

32. The IC of claim 28, wherein said threshold voltage is equal to one half the difference between said first and second power supply voltages.

33. The IC of claim 25, wherein said mode inputs comprise a first mode input for setting said Thevenins impedance to substantially match a characteristic impedance of said transmission line (TL) and said Thevenins voltage to substantially match said threshold voltage, wherein said first, second, fourth and fifth electronic switches are gated ON by said first, second, fourth and fifth control signals.

34. The IC of claim 33, wherein said mode inputs comprise a second mode for setting said Thevenins impedance to substantially match a characteristic impedance of said TL and said Thevenins voltage to greater than said threshold voltage, wherein said first, second, third and fifth electronic switches are gated ON by said first, second, third and fifth control signals.

35. The IC of claim 34, wherein said mode inputs comprise a third mode for setting said Thevenins impedance to substantially match a characteristic impedance of said TL and said Thevenins voltage to less than said threshold voltage, wherein said first, second fourth and sixth electronic switches are gated ON by said first, second fourth and sixth control signals.

36. The IC of claim 35, wherein said mode inputs comprise a fourth mode for setting said Thevenins impedance to greater than a characteristic impedance of said TL and said Thevenins voltage to substantially equal said threshold voltage, wherein said first and second electronic switches are gated on by said first and second control signals.

37. The IC of claim 36, wherein said mode inputs comprise a fifth mode for setting said Thevenins impedance to less than a characteristic impedance of said TL and said Thevenma voltage to substantialiy equal said threshold voltage, wherein said first, second, third, fourth, fifth, and sixth electronic switches are gated ON by said first, second, third, fourth, fifth, and sixth control signals.

38. The IC of claim 37, wherein said mode inputs comprise a driver mode wherein said first, second, and third termination networks operate as a driver circuit for impressing a drive signal on said common node in response to logic states of a driver signal controlling said first, second, third, fourth, fifth and sixth control signals, wherein said second, fourth and sixth electronic switches are gated ON by a first logic state of said driver signal and said first, third, and fifth electronic switches are gated ON by a second logic state of said driver signal.

39. The IC of claim 36, wherein said logic circuitry comprises: circuitry for alternating between selected of said first, second, third, fourth, and fifth modes in response to a first logic state of a dynamic enable signal and logic states of a modified receiver output signal;
- a state circuit for generating said modified receiver signal in response to said receiver output signal and a selected delay time.

40. The IC of claim 39, wherein said modified receiver transitions to a first logic state said delay time after said receiver output signal transitions to said first logic state and to a second logic state said selected delay time after said receiver signal transitions to said second logic state, wherein said selected delay time is set by delay control signal.

41. The IC of claim 40, wherein said circuitry switches to said fourth mode when said modified receiver signal has a first logic state and switches to said fifth mode when said modified receiver signal has a second logic state.

42. The IC of claim 39, wherein said first logic state of said dynamic mode signal is set in response to a selected signal quality parameter of said receiver output signal.

* * * * *

UNITED STATES PATENT AND TRADEMARK OFFICE
CERTIFICATE OF CORRECTION

PATENT NO. : 6,930,507 B2 Page 1 of 1
DATED : August 16, 2005
INVENTOR(S) : Daniel M. Dreps et al.

It is certified that error appears in the above-identified patent and that said Letters Patent is hereby corrected as shown below:

<u>Column 12,</u>
Line 27, replace "Thevenma" with -- Thevenins --,
Line 27, replace "substantialiy" with -- substantially --.

Signed and Sealed this

Thirtieth Day of May, 2006

JON W. DUDAS
*Director of the United States Patent and Trademark Office*